July 26, 1966    R. J. ALLEN ET AL    3,263,193
SUPERCONDUCTING TO NORMAL CONDUCTING CABLE TRANSITION
Filed Oct. 19, 1964
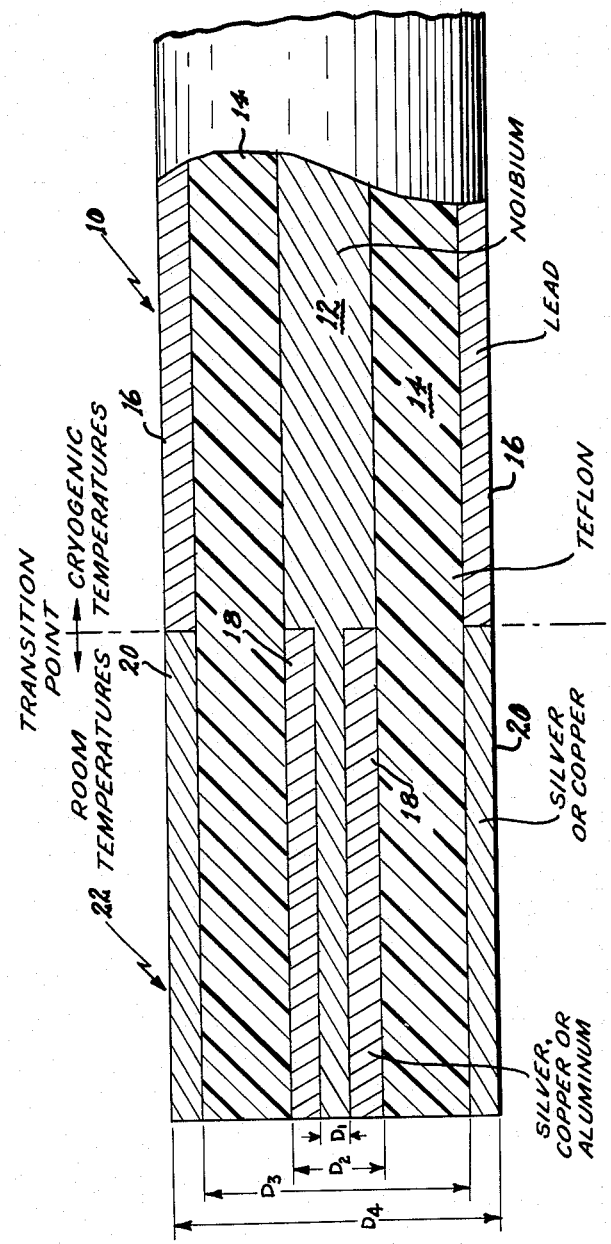
INVENTORS.
RICHARD J. ALLEN and
ALFRED J. CUMMINGS
BY Harry A. Herbert Jr
and Sherman H. Goldman
ATTORNEYS

United States Patent Office 3,263,193
Patented July 26, 1966

3,263,193
SUPERCONDUCTING TO NORMAL CONDUCTING CABLE TRANSITION
Richard J. Allen and Alfred J. Cummings, Baltimore, Md., assignors to the United States of America as represented by the Secretary of the Air Force
Filed Oct. 19, 1964, Ser. No. 404,995
4 Claims. (Cl. 333—96)

This invention relates generally to a transition cable and method of making the transition from superconducting to normal coaxial cable without the utilization of external mechanical devices.

Superconducting cables are used as transmission line delay devices since there is very low loss; however, some of this advantage is lost due to the necessity for lossy cables and connectors to bring the superconducting line to room temperature. Bringing the superconducting cable itself into a room temperature environment entails a loss resulting from the requirement of having a small cable of relatively poor normal-state conductors. Mechanical transitions from cryogenic temperatures to normal resistivity cable at room temperatures pose design difficulties due to the temperature change between assembly and operation in addition to high losses. Various attempts have been made to overcome the aforementioned problems; however, where only some of the features of this invention are utilized, the result has not been satisfactory.

In the invention as applied to a coaxial cable, the center conductor is overcoated with copper or silver prior to application of the dielectric. In addition, the outer conductor at the transition point is changed from the superconductor to copper or silver at the point where the overcoating begins on the inner conductor. This arrangement eliminates the poor normal-state conductivity of the superconducting cable with the coating of the conductors with metal of superior non-super conductive properties. Since at high frequencies the current flow is on the surface of the conductors, the resistivity of the coated conductor is essentially that of the outer coating, thereby reducing the losses.

The coating on the center conductor may be applied prior to the insulation being placed on the wire, as there is no appreciable build-up in conductor thickness. If the outer coating is vacuum deposited, a separate evaporent source may be used for the normal resistivity metal. This then leads to relatively little increased complexity in the cable fabrication.

Accordingly, it is a primary object of this invention to provide a transition cable and method for making the same wherein the disadvantages of that heretofore known are obviated.

It is another object of this invention to provide a transition cable and method for making same which does not utilize mechanical devices.

It is still another object of this invention to provide a transition cable and method for making same whereby losses are minimized.

It is a further object of this invention to provide a coaxial transition cable and method for making the same where there is no change in dimension at the point of transition.

Another object of this invention involves the provision of a cryogenic transition cable and method for making the same whereby fabrication complexity is not greatly increased.

Still aonther object of this invention involves a transition cable which eliminates the problem of thermal expansion at room temperatures.

A further object of this invention involves the provision of a coaxial transition cable that eliminates a set of connectors.

A still further object of this invention involves a transition cable and method for making same which utilize conventional, currently available materials and standard, mass production manufacturing techniques that afford economy in production and an improved product.

These and other advantages, features and objects of the invention will become more apparent from the following description taken in connection with the illustrative embodiment in the accompanying drawing, wherein the figure comprises a view partly in cross section of the transition portion of a coaxial cable.

Referring to the figure, there is shown a coaxial cable having a portion 10, shown at the right, which is operated at cryogenic temperatures. The center conductor 12 is surrounded by a dielectric material 14 and an outer conductor 16, as is conventional with coaxial cables. The materials chosen for the inner conductor 12 and outer conductor 16 are taken from the listings of materials which exhibit superconductive properties. Niobium is chosen in the preferred embodiment for the inner conductor 12 since it has a relatively high transition temperature of about 8° Kelvin, while lead with a transition temperature of about 7.2° Kelvin is chosen for the same reason for the outer conductor 16. Teflon is provided for the dielectric material 14 since its properties are relatively unaffected by temperature.

The transition line portion 22 at the left of the figure is operated at room temperature. Here the niobium is reduced in diameter at the transition point, and a material of superior non-superconductive conductivity, such as silver, is overcoated at 18 to the original diameter of the center conductor 12. The outer conductor 16 has a like material applied at 20 to overlie the normal conductive portion of the center conductor 12.

A set of illustrative dimensions for a transition line which has been found to produce excellent results with the previously noted, preferred materials, follows:

|  | Inches |
|---|---|
| D1 | .001 |
| D2 | .002 |
| D3 | .007 |
| D4 | .009 |

The technique for producing the transition line of the figure involves the steps of reducing the diameter of the center conductor 12 from the transition point into the normally conductive portion 22 of the line and overcoating the terminating or transition portions of the superconductive conductor with no appreciable build-up in the thickness thereof over the original, unreduced dimension of the superconductor. The overcoating may be applied by conventional evaporative, plating or spraying techniques. The dielectric coating is next applied over the entire length of the coated center conductor by conventional techniques as in standard coaxial lines, such as by flame spraying or dipping and sintering. The resultant dielectric-clad conductor is then coated with the superconductive material along the portion 10 and non-superconductive material along the portion 22 to overlie only the respective normal and superconductive conductors of the overcoated conductor. These operations may be performed by conventional vacuum deposition with separate sources. Any masking technique may be utilized with the vacuum deposition and the order of application of the sections of the outer conductor is not of any significance.

Although preferred materials have been designated with reference to the figure, it should be understood that the material deposited or plated on the superconductive center conductor may be of any material exhibiting the desired conductive characteristics at room temperature, i.e. copper or aluminum; while copper may also be substituted for silver on the outer conductor. In addition, the technique is also applicable to strip type transmission lines as well as coaxial cable, and the center conductor arrangement could be used as a method for terminating conventional leads for cryogenic circuitry.

Thus, there has been described a transition line and method for producing the same which results in an improved product which is easy and economical to produce.

Although the invention has been described with reference to a particular embodiment, it will be understood to those skilled in the art that the invention is capable of a variety of alternative embodiments within the spirit and scope of the appended claims.

We claim:

1. A coaxial transition line having one portion operable at cryogenic temperatures, and a second portion at relatively elevated temperatures comprising, a stepped center conductor having a larger diameter at said portion operable at cryogenic temperatures and a smaller diameter at said second portion at relatively elevated temperatures, said center conductor being of a material having substantially zero D.C. resistance at cryogenic temperatures, and an overcoating to the dimension of said larger diameter on said smaller diameter of a metal having normally good resistivity at temperatures above cryogenic temperatures, a coaxial outer conductor spaced from said inner conductor, said outer conductor being of a material exhibiting substantially zero resistivity at cryogenic temperatures at said portion operable at cryogenic temperatures and of a material having normally good resistivity at temperatures above cryogenic temperatures along said second portion, and a dielectric material between said outer and said inner conductor.

2. A transition line as defined in claim 1 wherein said stepped center conductor is niobium.

3. A transition line as defined in claim 1 wherein said dielectric is Teflon.

4. A transition line as defined in claim 1 wherein the material of said outer conductor having substantially zero resistivity at cryogenic temperatures is lead.

References Cited by the Examiner

UNITED STATES PATENTS 3,163,832   12/1964   Nahman _____ 333—99

HERMAN KARL SAALBACH, *Primary Examiner.*

L. ALLAHUT, *Assistant Examiner.*